US011976663B2

(12) United States Patent
Takeda

(10) Patent No.: US 11,976,663 B2
(45) Date of Patent: May 7, 2024

(54) VACUUM PUMP, ROTOR, AND ROTOR BODY WITH RUPTURE LOCATION CONTROL MEANS ON THE ROTOR

(71) Applicant: Edwards Japan Limited, Chiba (JP)

(72) Inventor: Shunsuke Takeda, Chiba (JP)

(73) Assignee: Edwards Japan Limited, Chiba (JP)

( * ) Notice: Subject to any disclaimer, the term of this patent is extended or adjusted under 35 U.S.C. 154(b) by 73 days.

(21) Appl. No.: 17/627,350

(22) PCT Filed: Jul. 10, 2020

(86) PCT No.: PCT/JP2020/027128
§ 371 (c)(1),
(2) Date: Jan. 14, 2022

(87) PCT Pub. No.: WO2021/015018
PCT Pub. Date: Jan. 28, 2021

(65) Prior Publication Data

US 2022/0260081 A1 Aug. 18, 2022

(30) Foreign Application Priority Data

Jul. 22, 2019 (JP) ................................ 2019-134934

(51) Int. Cl.

| | |
|---|---|
| ***F04D 19/04*** | (2006.01) |
| ***F04D 29/38*** | (2006.01) |
| *F04D 29/64* | (2006.01) |

(52) U.S. Cl.
CPC ......... *F04D 19/042* (2013.01); *F04D 29/388* (2013.01); *F04D 19/048* (2013.01); *F04D 29/644* (2013.01); *F05D 2210/12* (2013.01)

(58) Field of Classification Search
USPC .............................................................. 416/2
See application file for complete search history.

(56) References Cited

U.S. PATENT DOCUMENTS 3,164,370 A * 1/1965 Ethel .................... F01D 21/045 416/47
3,744,927 A * 7/1973 Bernaerts ................ B63H 1/20 416/131

(Continued)

FOREIGN PATENT DOCUMENTS

JP H064392 U * 1/1994
JP H064392 U 1/1994

(Continued)

OTHER PUBLICATIONS

Translation of JP-H064392 (Machine Translation provided by USPTO Search, Copyright 2023 Clarivate Analytics) (Year: 2023).*

(Continued)

*Primary Examiner* — Essama Omgba
*Assistant Examiner* — Geoffrey S Lee
(74) *Attorney, Agent, or Firm* — Theodore M. Magee; Westman, Champlin & Koehler, P.A.

(57) ABSTRACT

A vacuum pump includes: a casing formed with an inlet port or outlet port; a stator disposed inside the casing; and a rotor enclosed in the casing and including a shaft rotatably supported on the stator, and a rotor blade formed in a cylindrical shape with a plurality of blades arranged in multiple stages on an outer circumferential portion thereof, and secured to the shaft such as to be integrally rotatable therewith. The rotor blade is provided with a rupture location control groove as a rupture location control means that locally reduces rigidity of the rotor blade to control a location where the rotor blade ruptures.

5 Claims, 11 Drawing Sheets

(56) References Cited

U.S. PATENT DOCUMENTS

| | | | | |
|---|---|---|---|---|
| 4,062,638 | A * | 12/1977 | Hall, Jr. | F01D 11/006 416/193 A |
| 6,926,493 | B1 * | 8/2005 | Miyamoto | F04D 19/042 415/177 |
| 8,251,640 | B2 * | 8/2012 | Beckford | F01D 21/04 416/2 |
| 2004/0081569 | A1 * | 4/2004 | Sakaguchi | F04D 19/04 417/423.4 |
| 2012/0219400 | A1 * | 8/2012 | Kogame | F04D 29/522 415/9 |
| 2022/0260081 | A1 * | 8/2022 | Takeda | F04D 29/321 |

FOREIGN PATENT DOCUMENTS

| | | | | |
|---|---|---|---|---|
| JP | H08114196 | A | 5/1996 | |
| JP | H10274189 | A | 10/1998 | |
| JP | 2002070787 | A * | 3/2002 | F04D 19/044 |
| JP | 3792112 | B2 * | 7/2006 | F04D 19/04 |
| JP | 4484470 | B2 | 6/2010 | |
| JP | 2014181628 | A | 9/2014 | |
| WO | 2012032863 | A1 | 3/2012 | |
| WO | 2012043027 | A1 | 4/2012 | |

OTHER PUBLICATIONS

Translation of JP-3792112 (Machine Translation provided by USPTO Search, Copyright 2023 Clarivate Analytics) (Year: 2023).*

Translation of JP-2002070787-A (Machine Translation provided by USPTO Search, Copyright 2023 Clarivate Analytics) (Year: 2023 ).*

PCT International Search Report dated Sep. 29, 2020 for corresponding PCT application Serial No. PCT/JP2020/027128, 2 pages.

PCT International Written Opinion dated Sep. 29, 2020 for corresponding PCT application Serial No. PCT/JP2020/027128, 4 pages.

* cited by examiner

VACUUM PUMP, ROTOR, AND ROTOR BODY WITH RUPTURE LOCATION CONTROL MEANS ON THE ROTOR

CROSS-REFERENCE OF RELATED APPLICATION

This application is a Section 371 National Stage Application of International Application No. PCT/JP2020/027128, filed Jul. 10, 2020, which is incorporated by reference in its entirety and published as WO 2021/015018A1 on Jan. 28, 2021 and which claims priority of Japanese Application No. 2019-134934, filed Jul. 22, 2019.

BACKGROUND

The present invention relates to a vacuum pump, and a rotor and a rotor body for use in the vacuum pump, and more particularly to a vacuum pump used for exhausting a vacuum container, for example, and a rotor and a rotor body for use in the vacuum pump.

Vacuum pumps used for exhausting a semiconductor manufacturing apparatus or a vacuum container of an electron microscope or the like that requires a high degree of vacuum typically employ a structure in which a molecular pump system and a screw thread pump system downstream of the molecular pump system are integrally installed inside a casing that has an inlet port and an outlet port.

Inside the casing of the vacuum pump are provided a rotor that is rotatably supported and can be rotated at high speed by a motor portion, and a stator fixed to the casing of the vacuum pump.

With the rotor rapidly rotating, the rotor and stator of the molecular pump system achieve an exhaust effect, whereby the gas is sucked into the inlet port on the side of the molecular pump system, and expelled toward the screw thread pump system where the outlet port is provided.

The screw thread pump system is made up of a cylindrical portion formed on a side closer to a lower end of the rotor, an inner thread portion provided on an outer circumferential surface of the cylindrical portion and having a spiral groove on an outer surface thereof, and a screw thread spacer provided on an inner circumferential surface of the casing at a predetermined distance from the inner thread portion and having a spiral groove corresponding to the spiral groove of the inner thread portion on an inner surface thereof. The spiral groove of the inner thread portion and the spiral groove of the screw thread spacer are oriented in such a direction that when a gas is transported inside the spiral grooves in the rotating direction of the rotor, the gas will be guided toward the outlet port. The spiral grooves have a depth that reduces toward the outlet port so that the gas transported inside the spiral grooves is compressed as it approaches the outlet port.

Thus, after exiting the molecular pump system, the gas is sent to the screw thread pump system, where it is compressed and expelled from the outlet port to the outside of the casing.

If, during the operation of the vacuum pump, some trouble occurs and the rotor collides against the stator or other stator components in vacuum, the angular momentum of the rotor is transmitted to the stator and stator components, which causes an instantaneous spike in torque applied to the rotor in the rotating direction, and at the same time generates a large stress on the entire vacuum pump.

Therefore, various proposals have been made for the dampening of such shock of torque (see, for example, Japanese Patent Application Publications Nos. H10-274189 and H08-114196, and Japanese Patent No. 4484470).

The vacuum pumps disclosed in Japanese Patent Application Publications Nos. H10-274189 and H08-114196, and Japanese Patent No. 4484470 are turbomolecular pumps provided with a mechanism which, in the event of torque that acts to rotate the pump in the rotating direction of the rotor being generated, dampens this torque. Nevertheless, if the dampening mechanism fails to absorb the torque, the pump will break.

The discussion above is merely provided for general background information and is not intended to be used as an aid in determining the scope of the claimed subject matter. The claimed subject matter is not limited to implementations that solve any or all disadvantages noted in the background.

SUMMARY

In the event of an instantaneous spike in torque in the rotating direction of the rotor as mentioned in the techniques disclosed in Japanese Patent Application Publications Nos. H10-274189 and H08-114196, and Japanese Patent No. 4484470, if the dampening mechanism fails to absorb the large stress applied to the entire vacuum pump, unexpected parts of the vacuum pump may break in an unexpected fashion.

Accordingly, it is necessary to increase the mechanical strength of the entire vacuum pump, not to mention the mounting strength at a joint between a flange portion of the vacuum pump and a flange portion of a vacuum container for higher safety of the vacuum pump. The problem of raised production cost resulted from this necessity.

The unpredictability of location and manner of breakage of the vacuum pump makes it difficult to plan a measure for when a trouble happens. Hence the problem of a large amount of time consumed for the processing when a trouble happens.

Technical problems to be solved thus arise, and an object of the present invention is to solve these problems, for providing a vacuum pump equipped with an inexpensive structure that exhibits consistent shock absorption performance wherein rupture occurs at a planned location in a planned manner when a higher torque than expected that rotates a rotor in its rotating direction is generated, and for providing a rotor and a rotor body for use in the vacuum pump.

The present invention has been proposed to achieve the object stated above. One embodiment of the invention provides a vacuum pump including: a casing formed with an inlet port or an outlet port; a stator portion disposed inside the casing; and a rotor enclosed in the casing and including a shaft rotatably supported by the stator portion, and a rotor body formed in a cylindrical shape with a plurality of blades arranged in multiple stages on an outer circumferential portion thereof, and secured to the shaft such as to be integrally rotatable therewith, the rotor body being provided with a rupture location control means that locally reduces rigidity of the rotor body to control location where the rotor body ruptures.

According to this configuration, when a higher torque than expected is generated and applied on the rotor, the rotor body of the rotor ruptures in a planned fashion at a location where the rupture location control means is provided, whereby the shock of torque is absorbed. Namely, the vacuum pump ruptures at a planned location in a planned manner, so that a post-rupture process can be readily carried out in a preset procedure. This allows for consistent maintenance work and inexpensive processing.

In accordance with a further embodiment, the rupture location control means is a groove provided on an outer circumferential surface of the rotor body along an axial direction of the rotor body between the blades adjoining each other in the axial direction.

According to this configuration, the rupture location control means is provided as a groove on an outer circumferential surface of the rotor body along an axial direction of the rotor body between the blades adjoining each other in the axial direction. By providing this groove, the rotor body is reduced in thickness and lowered in mechanical strength in a location where the groove is provided compared to other parts where the groove is not provided. Accordingly, in the event of a higher torque than expected being generated and applied on the rotor, rupture occurs in a planned manner along an axial direction at a location where the groove is provided along the axial direction on the outer circumferential surface of the rotor body, and absorbs the shock of torque. Namely, the vacuum pump ruptures at a planned location in a planned manner, so that a post-rupture process can be readily carried out in a preset procedure. This allows for consistent maintenance work and inexpensive processing.

In accordance with a further embodiment, the rupture location control means is a groove provided on an inner circumferential surface of the rotor body along an axial direction of the rotor body.

According to this configuration, the rupture location control means is provided as a groove on an inner circumferential surface of the rotor body along an axial direction of the rotor body. By providing this groove, the rotor body is reduced in thickness and lowered in mechanical strength in a location where the groove is provided compared to other parts where the groove is not provided. Accordingly, in the event of a higher torque than expected being generated and applied on the rotor, rupture occurs in a planned manner along an axial direction at a location where the groove is provided along the axial direction on the inner circumferential surface of the rotor body, and absorbs the shock of torque. Namely, the vacuum pump ruptures at a planned location in a planned manner, so that a post-rupture process can be readily carried out in a preset procedure. This allows for consistent maintenance work and inexpensive processing.

In accordance with a further embodiment, the rupture location control means is a groove provided on at least one of an outer circumferential surface or an inner circumferential surface of the rotor body along a circumferential direction of the rotor body.

According to this configuration, the rupture location control means is provided as a groove on at least one of an outer circumferential surface or an inner circumferential surface of the rotor body along a circumferential direction of the rotor body. By providing this groove, the rotor body is reduced in thickness and lowered in mechanical strength in a location where the groove is provided compared to other parts where the groove is not provided. Accordingly, in the event of a higher torque than expected being generated and applied on the rotor, rupture occurs in a planned manner along a circumferential direction of the rotor body at a location where the groove is provided on at least one of the outer circumferential surface or inner circumferential surface of the rotor body along the circumferential direction of the rotor body, and absorbs the shock of torque. Namely, the vacuum pump ruptures at a planned location in a planned manner, so that a post-rupture process can be readily carried out in a preset procedure. This allows for consistent maintenance work and inexpensive processing.

In accordance with a further embodiment, the groove is one of a plurality of grooves and wherein each groove corresponds to a respective bolt hole provided to the rotor body for attaching the rotor body to the shaft.

According to this configuration, the groove as a rupture location control means is provided to each correspond to each of the plurality of bolt holes that are provided for secure attachment of the shaft via bolts. The portions where the grooves are provided and the portions where the bolt holes are provided are weaker and lower in mechanical strength than other parts. Accordingly, in the event of a higher torque than expected being generated and applied on the rotor, rupture occurs in a planned manner at a groove and at a location where the groove is aligned with a bolt hole, and absorbs the shock of torque. Namely, the vacuum pump ruptures at a planned location in a planned manner, so that a post-rupture process can be readily carried out in a preset procedure. This allows for consistent maintenance work and inexpensive processing.

In accordance with one embodiment, a rotor is rotatably attached to a stator portion that is disposed inside a casing, which is formed with an inlet port or an outlet port, of a vacuum pump, the rotor including: a shaft rotatably supported by the stator portion; a rotor body formed in a cylindrical shape, with a plurality of blades arranged in multiple stages on an outer circumferential portion thereof, and secured to the shaft such as to be integrally rotatable therewith; and a rupture location control means that is provided to the rotor body and locally reduces rigidity of the rotor body to control location where the rotor body ruptures.

According to this configuration, when a higher torque than expected is generated and applied on the rotor, the rotor body of the rotor ruptures in a planned fashion at a location where the rupture location control means is provided, whereby the shock of torque is absorbed. Namely, the rotor ruptures at a planned location in a planned manner, so that a post-rupture process can be readily carried out in a preset procedure. This allows for consistent maintenance work and inexpensive processing.

In accordance with a further embodiment, a rotor body is rotatably attached via a shaft to a stator portion that is disposed inside a casing, which is formed with an inlet port or an outlet port, of a vacuum pump, the rotor body including: a cylindrical member formed in a cylindrical shape, with a plurality of blades arranged in multiple stages on an outer circumferential portion thereof; and a rupture location control means that is provided to the cylindrical member and locally reduces rigidity of the cylindrical member to control location where the cylindrical member ruptures.

According to this structure, when a higher torque than expected is generated and applied on the rotor body, the cylindrical member ruptures in a planned fashion at a location where the rupture location control means is provided, whereby the shock of torque is absorbed. Namely, the cylindrical member ruptures at a planned location in a planned manner, so that a post-rupture process can be readily carried out in a preset procedure. This allows for consistent maintenance work and inexpensive processing.

According to the invention, when a higher torque than expected is generated and applied on the rotor, the rotor body of the rotor ruptures in a planned fashion at a location where the rupture location control means is provided, whereby the shock of torque can be absorbed. Namely, the vacuum pump ruptures at a planned location in a planned manner, so that a post-rupture process can be readily carried out in a preset procedure, which is expected to provide effects of making maintenance work consistent and allowing for inexpensive processing.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DETAILED DESCRIPTION

Figure 1:
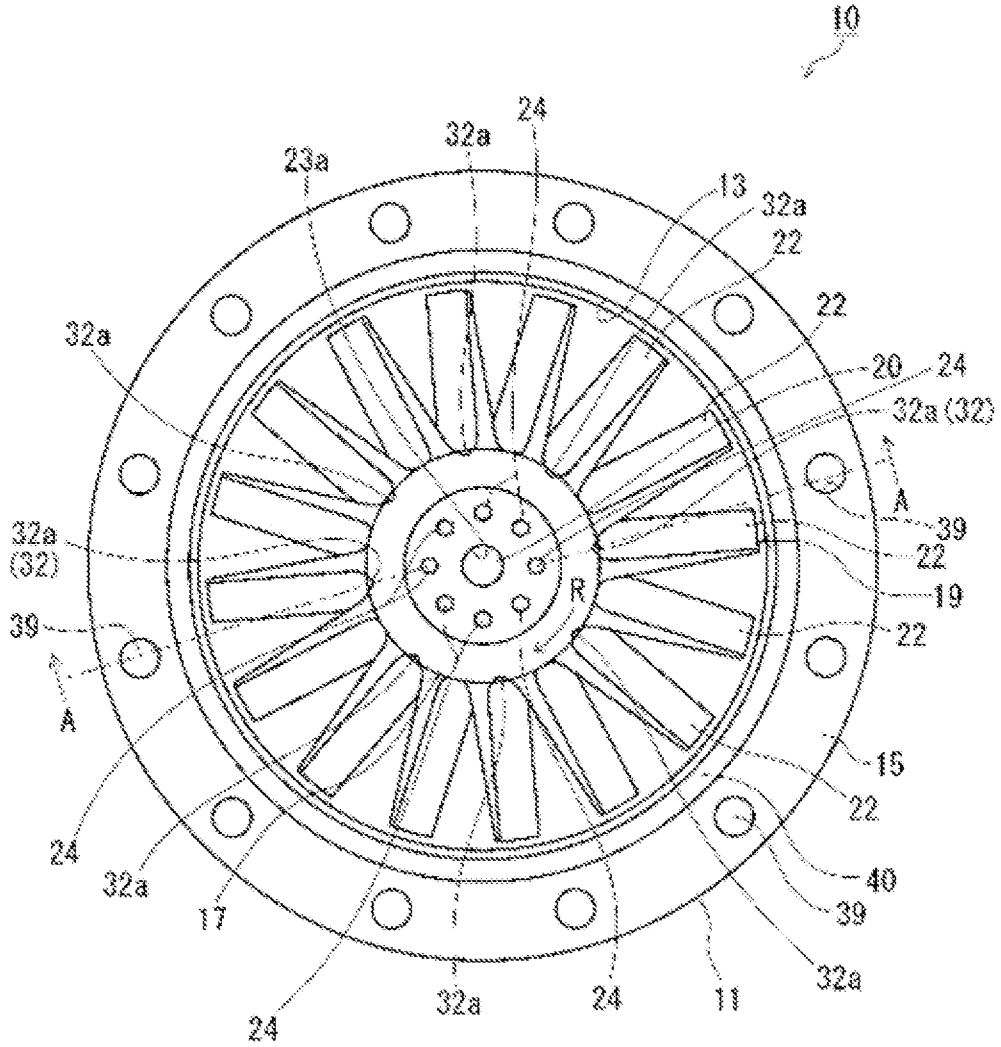
FIG. 1 is a plan view of a vacuum pump illustrated as one embodiment of the present invention.

The present invention was made to achieve an object of providing a vacuum pump with an inexpensive structure that exhibits consistent shock absorption performance wherein rupture occurs at a planned location in a planned manner in the event of a higher instantaneous torque than expected that rotates a rotor in its rotating direction being generated; as well as a rotor and a rotor body for use in the vacuum pump. The invention achieved the object by providing a vacuum pump including: a casing formed with an inlet port or an outlet port; a stator portion disposed inside the casing; and a rotor enclosed in the casing and including a shaft rotatably supported by the stator portion, and a rotor body formed in a cylindrical shape with a plurality of blades arranged in multiple stages on an outer circumferential portion thereof, and secured to the shaft such as to be integrally rotatable therewith, the rotor body being provided with a rupture location control means that locally reduces rigidity of the rotor body to control location where the rotor body ruptures.

EMBODIMENTS

Hereinafter, an example of embodiment of the present invention will be described in detail with reference to the accompanying drawings. Where a number of constituent elements, value, quantity, or range is mentioned in the following embodiment, it is not intended to limit it to a specific value, unless otherwise explicitly indicated and unless it is clearly limited to the specific value in principle, and the number, value, quantity, or range may be more than or less than the specific value.

Where a shape of a constituent element or a positional relationship between elements is mentioned, it should be understood to include substantially approximate or similar shapes and the like, unless otherwise explicitly indicated and unless other options are clearly excluded in principle.

The drawings may exaggerate a characteristic feature by enlargement or otherwise for easier understanding of the feature, and may not necessarily illustrate the constituent elements in the same size and proportion as actual elements. In some cross-sectional views, hatching for some constituent elements may be omitted for easier understanding of a cross-sectional structure of a constituent element.

Expressions indicative of directions such as up and down or left and right in the following description should not be taken as absolutes. The expressions may be suitable for a vacuum pump of the present invention when various components are in their illustrated postures, but when their postures change, the expressions should be interpreted differently in accordance with the change in posture. Throughout the description of embodiment, same elements are given the same reference numerals.

Figure 2:
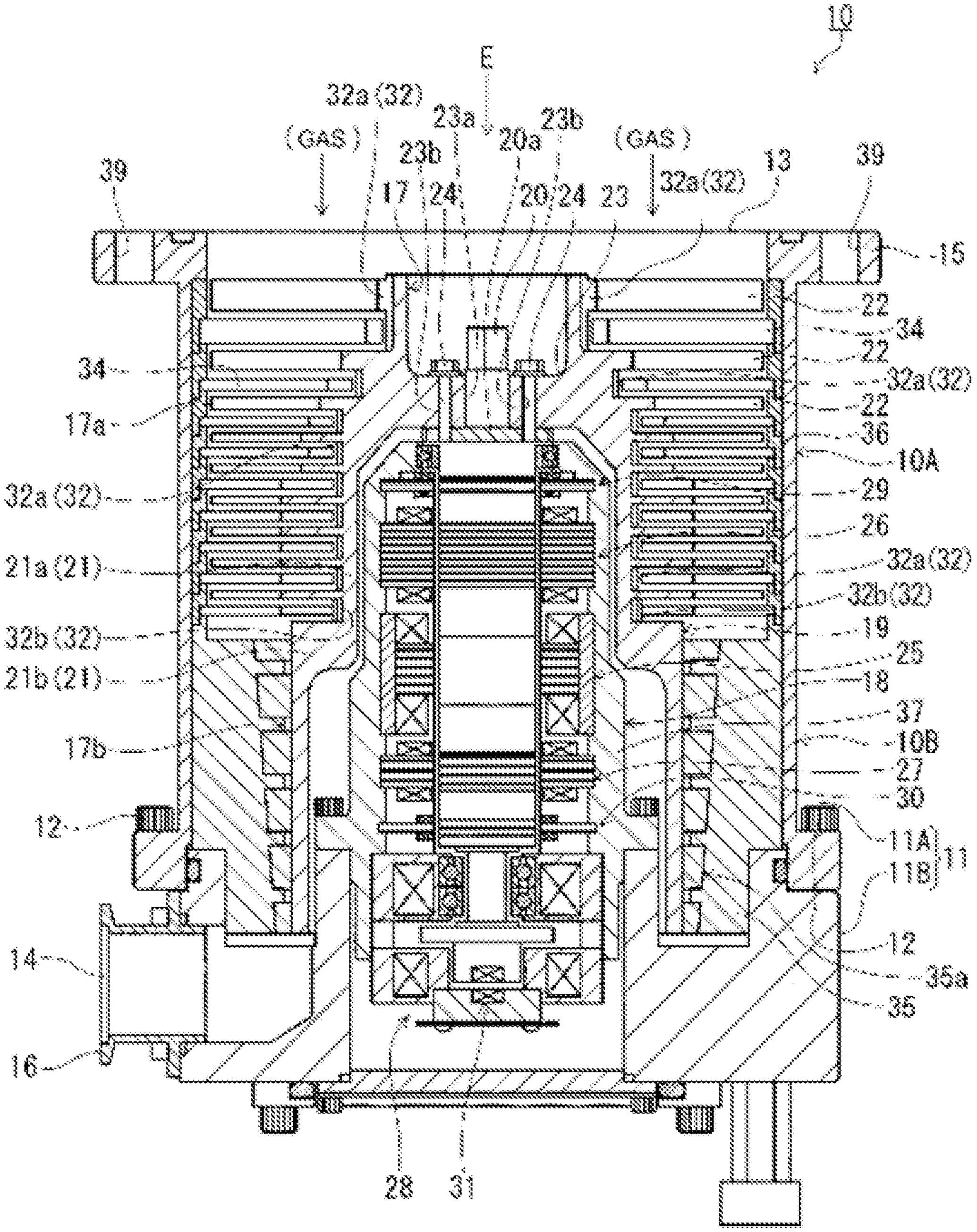
FIG. 2 is a longitudinal cross-sectional side view along line A-A of FIG. 1.

FIG. 1 and FIG. 2 illustrate one embodiment of a vacuum pump 10 according to the present invention. FIG. 1 is a plan view and FIG. 2 is a longitudinal cross-sectional side view along line A-A of FIG. 1.

The vacuum pump 10 illustrated in FIG. 1 and FIG. 2 is a composite pump equipped with a molecular pump system 10A as a gas exhaust system, and a screw thread pump system 10B. The vacuum pump 10 is used as a gas exhaust means of a process chamber in, for example, a semiconductor manufacturing apparatus, flat panel display manufacturing apparatus, or solar panel manufacturing apparatus, or other sealed chambers.

As illustrated in FIG. 1, the vacuum pump 10 includes a casing 11. As illustrated in FIG. 2, the casing 11 is made up of a tubular pump case 11A integrated with a pump base 11B in a direction of its tube axis by fastening members 12, and has a substantially cylindrical shape with a bottom.

An upper end side (upper side in the paper plane of FIG. 2) of the pump case 11A is open as an inlet port 13, and as illustrated in FIG. 2, the pump base 11B is provided with an outlet port 14. A flange 15 is formed to the inlet port 13, and a flange 16 is formed to the outlet port 14. A sealed chamber (not shown) with a high degree of vacuum such as a process chamber or the like of a semiconductor manufacturing apparatus, for example, is connected to the flange 15 of the inlet port 13, while an auxiliary pump or the like (not shown) is connected to the flange 16 of the outlet port 14 for fluid communication.

A structure that exhibits an exhaust function is accommodated inside the casing 11 so that a gas inside the sealed chamber is sucked into the inlet port 13 and expelled from the outlet port 14. This way, the sealed chamber can be exhausted of a reaction gas for the manufacture of semiconductors, for example, or other gases. While FIG. 1 and FIG. 2 show a structure in which the vacuum pump 10 is arranged vertically, the vacuum pump 10 may be oriented horizontally and attached to a side of a sealed chamber, or the inlet port 13 may be oriented downward and attached to an upper portion of a sealed chamber.

More particularly, the structure that exhibits the exhaust function is roughly composed of a rotatably supported rotor 17 and a stator 18 fixed to the casing 11.

The rotor 17 is made up of a rotor body 19, a shaft 20, and others.

Figure 3:
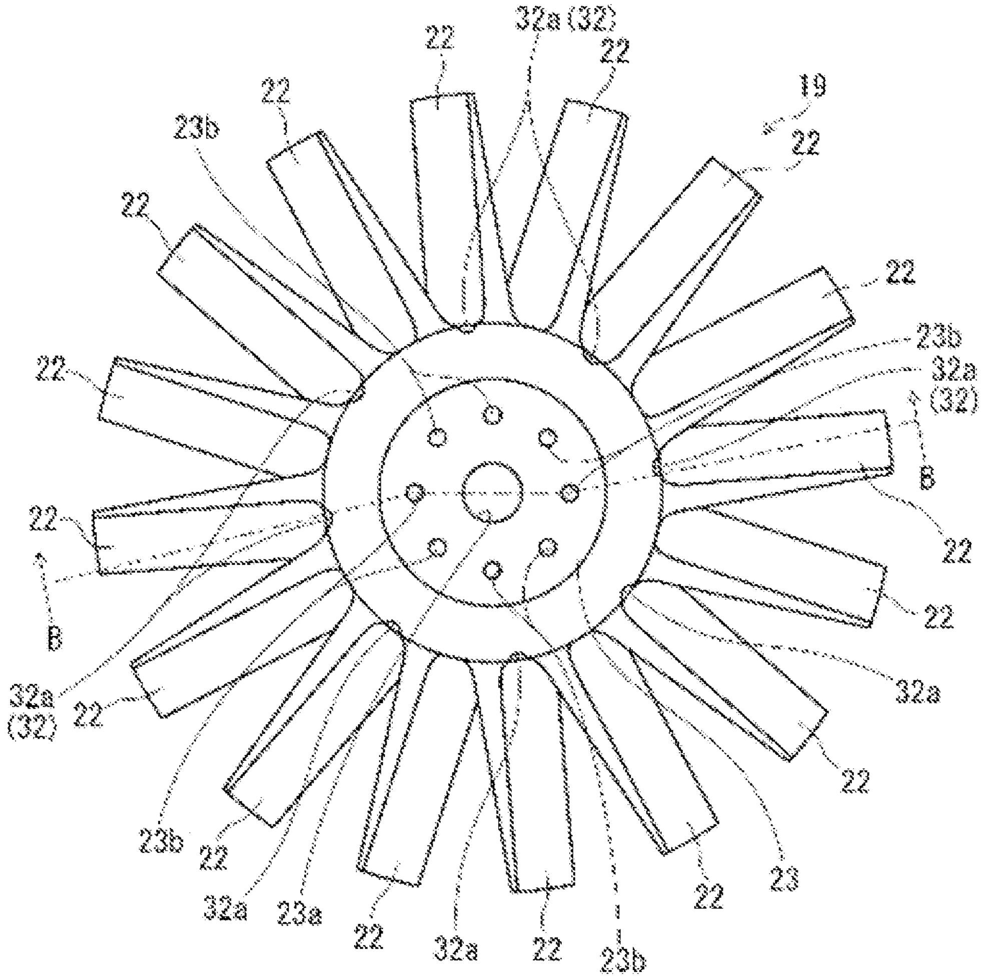
FIG. 3 is a plan view of a rotor body used in the vacuum pump illustrated in FIG. 1 and FIG. 2.
Figure 4:
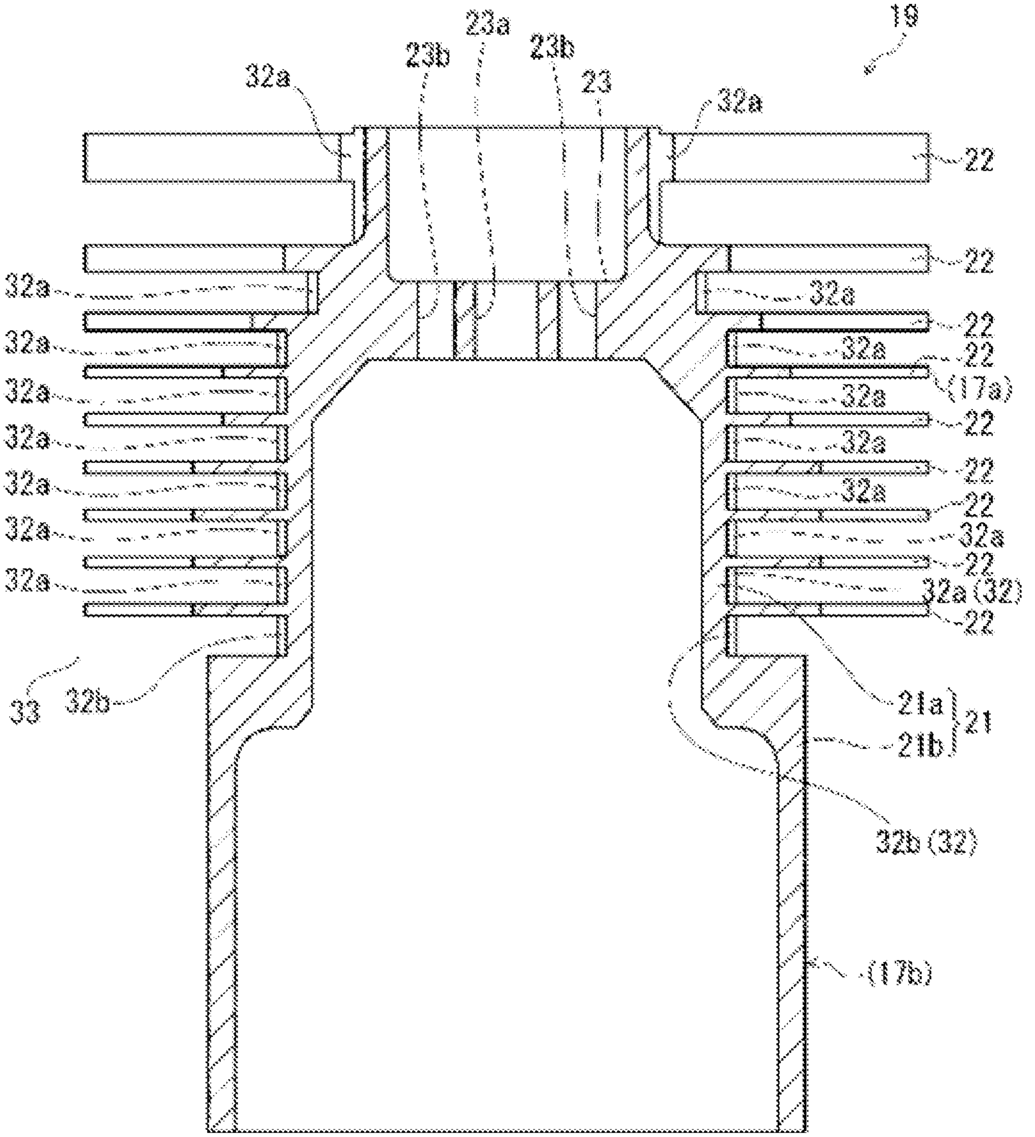
FIG. 4 is a longitudinal cross-sectional side view along line B-B of FIG. 3.

The rotor body 19 has a cylindrical member 21, which integrally forms a first cylindrical portion 21*a* disposed on the side where there is the inlet port 13 (molecular pump system 10A) and a second cylindrical portion 21*b* disposed on the side where there is the outlet port 14 (thread screw pump system 10B) as illustrated not only in FIG. 1 and FIG. 2 but also in FIG. 3 and FIG. 4.

The first cylindrical portion 21*a* is a substantially cylindrical member and forms a rotor portion 17*a* of the molecular pump system 10A. As illustrated in FIG. 1, FIG. 3, and FIG. 4, a plurality of blades 22 extend radially from an outer circumferential surface of the first cylindrical portion 21*a* outward in a plane perpendicular to an axis of the rotor body 19 and shaft 20 and are substantially equally spaced apart in a rotating direction. Each blade 22 is inclined in the same direction at a predetermined angle relative to the horizontal direction. The first cylindrical portion 21*a* is formed with a plurality of stages of these radially extending sets of blades 22 at an predetermined interval along the axial direction.

As illustrated in FIG. 2 and FIG. 4, a partition wall 23 is formed in a midway point along the axial direction of the first cylindrical portion 21*a* for connection with the shaft 20. The partition wall 23 is formed with a shaft hole 23*a* for an upper end side of the shaft 20 to be inserted and attached, and bolt holes 23*b* for mounting bolts 24 to be attached to secure the shaft 20. Eight bolt holes 23*b* are circumferentially equally spaced on a concentric circle drawn around the shaft hole 23*a*. The number of the bolt holes 23*b* is not limited to this.

The second cylindrical portion 21*b* is a member having a cylindrical outer circumferential surface and forms a rotor portion 17*b* of the screw thread pump system 10B.

The shaft 20 is a columnar member that forms a shaft of the rotor 17, formed integrally with a flange portion 20*a* in an upper end portion thereof as illustrated in FIG. 2, which is screwed to the partition wall 23 of the first cylindrical portion 21*a* by the mounting bolts 24. Accordingly, the flange portion 20*a* is provided with eight mounting holes (not shown) corresponding to the bolt holes 23*b* in the partition wall 23. The shaft 20 is secured and integrated with the cylindrical member 21 by inserting the upper end portion into the shaft hole 23*a* from inside of the first cylindrical portion 21*a* (from below) until the flange portion 20*a* integral with the shaft 20 contacts a lower surface of the partition wall 23, after which the mounting bolts 24 are screwed into the mounting holes of the flange portion 20*a* through the bolt holes 23*b* from an upper side of the partition wall 23.

A permanent magnet is fixedly attached to an outer circumferential surface in a midway point along the axial direction of the shaft 20 and forms a portion on the rotor 17 side of a motor portion 25. This permanent magnet forms magnetic poles around the circumference of the shaft 20, the N pole extending over half the circumference of the outer circumferential surface and the S pole extending over the remaining half of the circumference.

Moreover, at the upper end side (inlet port 13 side) of the shaft 20 is formed a rotor 17 side part of a magnetic bearing portion 26 for supporting the shaft 20 in a radial direction relative to the motor portion 25, while at the lower end side (outlet port 14 side) is formed, similarly, a rotor 17 side part of a magnetic bearing portion 27 for supporting the shaft 20 in the radial direction relative to the motor portion 25. Further, a rotor 17 side part of a magnetic bearing portion 28 is formed at the lower end of the shaft 20 for supporting the shaft 20 in the axial direction (thrust direction).

Near the magnetic bearing portions 26 and 27 are provided rotor 17 side portions of displacement sensors 29 and 30, respectively, so that a displacement in the radial direction of the shaft 20 can be detected.

Further, a rotor 17 side portion of a displacement sensor 31 is provided at the lower end of the shaft 20 so that a displacement in the axial direction of the shaft 20 can be detected.

These rotor 17 side parts of the magnetic bearing portions 26 and 27 and the displacement sensors 29 and 30 are formed by laminated steel plates in which steel plates are stacked in the shaft direction of the rotor 17. This is for preventing an eddy current from being generated in the shaft 20 by magnetic fields created by coils that form stator 18 side parts of the magnetic bearing portions 26 and 27 and the displacement sensors 29 and 30.

The rotor 17 described above is composed using metal such as stainless steel and aluminum alloy.

The first cylindrical portion 21*a* of the rotor body 19 in the rotor 17 is provided with rupture location control grooves 32 as rupture location control means.

The rupture location control grooves 32 include, as illustrated in FIG. 1 to FIG. 4, first rupture location control grooves 32*a* formed on an outer circumferential surface along the axial direction of the first cylindrical portion 21*a*, and a second rupture location control groove 32*b* formed along an outer circumference at the lower end of the first cylindrical portion 21*a* adjacent the second cylindrical portion 21*b* as illustrated in FIG. 2 and FIG. 4.

Figure 5:
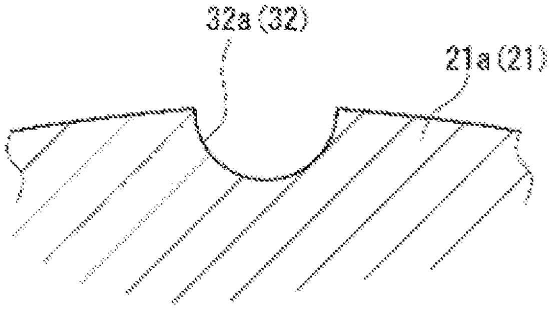
FIG. 5 is a cross-sectional view explaining one example of a groove as a rupture location control means in the vacuum pump.

The first rupture location control grooves 32*a* are substantially equally spaced apart in the circumferential direction between blades 22 adjoining each other in the axial direction, as well as along the axial direction of the rotor body 19, on the outer circumferential surface of the first cylindrical portion 21*a*. The first rupture location control grooves 32*a* are 5.8 mm in width and 8 to 15 mm in depth, for example, which may vary depending on the material and thickness of the cylindrical member 21, and have a semicircular concave curved cross-sectional shape as illustrated in FIG. 5. The rotor body 19 is reduced in thickness and lowered in mechanical strength in locations where the first rupture location control grooves 32*a* of the first cylindrical portion 21*a* are provided compared to other parts of the first cylindrical portion 21*a* where the first rupture location control grooves 32*a* are not provided. Accordingly, in the event of a higher torque than expected being generated and applied on the rotor 17, the rotor body 19 ruptures in locations where the first rupture location control grooves 32*a* are provided along the axial direction on the outer circumferential surface of the first cylindrical portion 21*a* in a planned manner along the axial direction, and this rupture can absorb the shock of torque on the entire vacuum pump 10.

The second rupture location control groove 32*b* is formed horizontally substantially all around the outer circumference at the lower end of the first cylindrical portion 21*a* adjacent the second cylindrical portion 21*b*. Similarly to the first rupture location control grooves 32*a*, the second rupture location control groove 32*b* is 5.8 mm in width and 8 to 15 mm in depth, for example, which may vary depending on the material and thickness of the cylindrical member 21, and has a semicircular concave curved cross-sectional shape similarly to the first rupture location control grooves 32*a*. With the second rupture location control groove 32*b* around the outer circumference at the lower end of the first cylindrical portion 21*a* adjacent the second cylindrical portion 21*b*, the rotor body 19 is reduced in thickness and lowered in mechanical strength in the location where the second rupture location control groove 32*b* is provided to the cylindrical member 21 compared to other parts where the groove is not provided, similarly to the case with the first rupture location control grooves 32*a*. Accordingly, in the event that a higher torque than expected is generated and this torque is applied on the rotor 17, the cylindrical member 21 ruptures in a planned location that is substantially along a boundary between the first cylindrical portion 21*a* and the second cylindrical portion 21*b* (portion indicated by a one-dot chain line and denoted at 33 in FIG. 4, hereinafter referred to as "boundary 33") where the second rupture location control groove 32*b* is provided around the outer circumference at the lower end of the first cylindrical portion 21*a* adjacent the second cylindrical portion 21*b*. The cylindrical member 21 then splits into the first cylindrical portion 21*a* and second cylindrical portion 21*b*, and this rupture can absorb the shock of torque.

The stator 18 is formed on the inner circumference of the casing 11. The stator 18 is made up of a stator blade 34 provided on the side where there is the inlet port 13 (molecular pump system 10A), and a screw thread spacer 35 provided on the side where there is the outlet port 14 (screw thread pump system 10B).

The stator blade 34 is made up of blades inclined at a predetermined angle from a plane perpendicular to the axis of the shaft 20 and extending from an inner circumferential surface of the casing 11 toward the shaft 20. A plurality of stages of the stator blades 34 are formed along the axial direction in the molecular pump system 10A such as to alternate with the blades 22 of the rotor body 19. The stages of the stator blades 34 are spaced apart from each other by cylindrical spacers 36.

The screw thread spacer 35 is a columnar member formed with a spiral groove 35*a* on an inner circumferential surface thereof. The inner circumferential surface of the screw thread spacer 35 opposes the outer circumferential surface of the second cylindrical portion 21*b* of the cylindrical member 21 with a predetermined clearance (gap) therebetween. The spiral groove 35*a* formed on the screw thread spacer 35 is oriented in such a direction that when a gas is transported in the spiral groove 35*a* in the rotating direction of the rotor 17, the gas will travel toward the outlet port 14. The spiral groove 35*a* has a depth that reduces toward the outlet port 14 so that the gas transported in the spiral groove 35*a* is compressed as it approaches the outlet port 14.

The stator 18 is composed using metal such as stainless steel and aluminum alloy.

The pump base 11B is a disc-shaped member, with a cylindrical stator column 37 oriented toward the inlet port 13 and attached in the center of the radial direction concentrically with the rotating axis of the rotor 17. The stator column 37 supports the stator side parts of the motor portion 25, magnetic bearing portions 26 and 27, and displacement sensors 29 and 30.

In the motor portion 25, a predetermined number of poles are arranged on the inner circumference of the stator coil at equal distance so that a rotating magnetic field can be generated around the magnetic poles formed on the shaft 20. On the outer circumference of the stator coil is arranged a collar 38, which is a cylindrical member made of metal such as stainless steel, to protect the motor portion 25.

The magnetic bearing portions 26 and 27 are formed by coils arranged at every 90 degrees around the rotating axis. These coils of the magnetic bearing portions 26 and 27 generate magnetic fields that attract the shaft 20, so that the shaft 20 is magnetically levitated in the radial direction.

The magnetic bearing portion 28 is formed at the bottom of the stator column 37. The magnetic bearing portion 28 is formed by a disc extending out from the shaft 20 and coils arranged on and under this disc. These coils generate magnetic fields that attract this disc, so that the shaft 20 is magnetically levitated in the axial direction.

The inlet port 13 of the casing 11 is formed with a flange 15 extending out radially beyond the pump case 11A. The flange 15 is formed with bolt holes 39 for bolts (not shown) to pass through, and a groove 40 for mounting an O-ring to keep a seal between itself and a flange on the vacuum container side (not shown).

The vacuum pump 10 configured as described above operates as follows to exhaust a vacuum container of a gas.

First, the magnetic bearing portions 26, 27, and 28 magnetically levitate the shaft 20 to support the rotor 17 in space in a non-contact manner.

Next, the motor portion 25 is activated to rotate the rotor 17 in a predetermined direction. The rotation speed is about 30,000 rotations per minute, for example. In this embodiment, the rotating direction of the rotor 17 is the clockwise direction indicated by the arrow line R in FIG. 1 when viewed from the direction of the arrow line E in FIG. 2. The vacuum pump 10 can also be designed to rotate in the counterclockwise direction.

When the rotor 17 rotates, the gas is sucked into the inlet port 13 by the action of the blades 22 of the rotor body 19 and the stator blades 34 of the stator 18, and is compressed as it travels down to the lower stages. After compressed in the molecular pump system 10A, the gas is further compressed in the screw thread pump system 10B, and expelled from the outlet port 14.

Next, a process when a higher torque than expected is generated in the rotor 17 of the vacuum pump 10 configured as described above, and when this torque is applied on the rotor 17, will be described.

In the vacuum pump 10 of this embodiment, a plurality of first rupture location control grooves 32*a* and a second rupture location control groove 32*b* are provided on the outer circumferential surface of the first cylindrical portion 21*a*. The rotor body 19 is reduced in thickness and lowered in mechanical strength in the locations where these first rupture location control grooves 32*a* and second rupture location control groove 32*b* are provided compared to other parts where the first rupture location control grooves 32*a* and second rupture location control groove 32*b* are not provided. Accordingly, in the event of a higher torque than expected being generated and applied on the rotor 17, rupture occurs at the locations of the first rupture location control grooves 32*a* and/or second rupture location control groove 32*b* in a planned manner along these grooves, whereby the first cylindrical portion 21*a* and second cylindrical portion 21*b* are separated into several pieces, and this separation absorbs the shock of torque. Here, for example, the first cylindrical portion 21*a* cracks along each of the plurality of first rupture location control grooves 32*a*, ruptures along the axial direction, and breaks apart into several pieces, and/or, the first cylindrical portion 21*a* and second cylindrical portion 21*b* rupture in the circumferential direction along the boundary 33 shown in FIG. 4 therebetween and break apart into several pieces. Namely, rupture occurs in a planned manner in planned locations which are the first rupture location control grooves 32*a* and/or second rupture location control groove 32*b*, so that a process after the rupture can be readily carried out in a preset procedure. This allows for consistent maintenance work and inexpensive processing.

The first rupture location control grooves 32*a* as rupture location control means are provided such as to each correspond to each of the plurality of bolt holes 23*b* that are provided for secure attachment of the shaft 20 via bolts. The portions where the first rupture location control grooves 32*a* are provided and the portions where the bolt holes 23*b* are provided are weaker and lower in mechanical strength than other parts. Therefore, when a higher torque than expected is generated and applied on the rotor 17, rupture easily occurs in a planned manner not only at the first rupture location control grooves 32*a* but also at a location where a first rupture location control groove 32*a* is aligned with a bolt hole 23*b*, so that rupture that occurs at this location also absorbs the shock of torque. Thus the process after the rupture can be readily carried out in a preset procedure.

Figure 6:
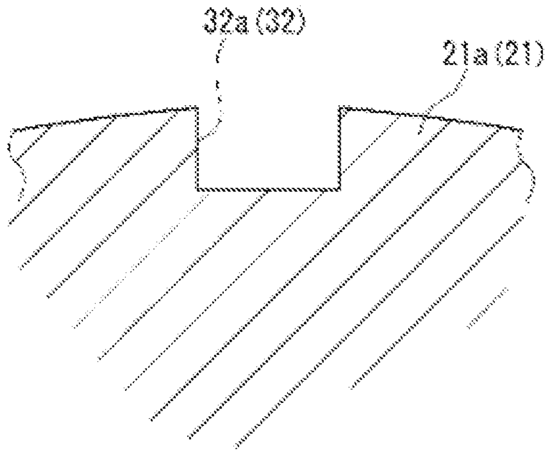
FIG. 6 is a cross-sectional view explaining a variation example of the groove as a rupture location control means in the vacuum pump.
Figure 7:
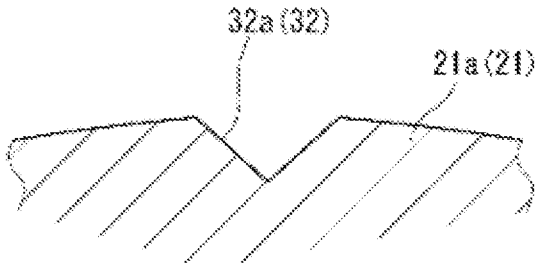
FIG. 7 is a cross-sectional view explaining another variation example of the groove as a rupture location control means in the vacuum pump.

While the embodiment described above has shown a structure in which the first rupture location control groove 32*a* and second rupture location control groove 32*b* have a semicircular concave curved cross-sectional shape as illustrated in FIG. 5, the shape is not limited to such a semicircular concave curve. For example, the grooves may have a square recessed shape as illustrated in FIG. 6, or a V-shaped recessed shape as illustrated in FIG. 7.

Figure 8:
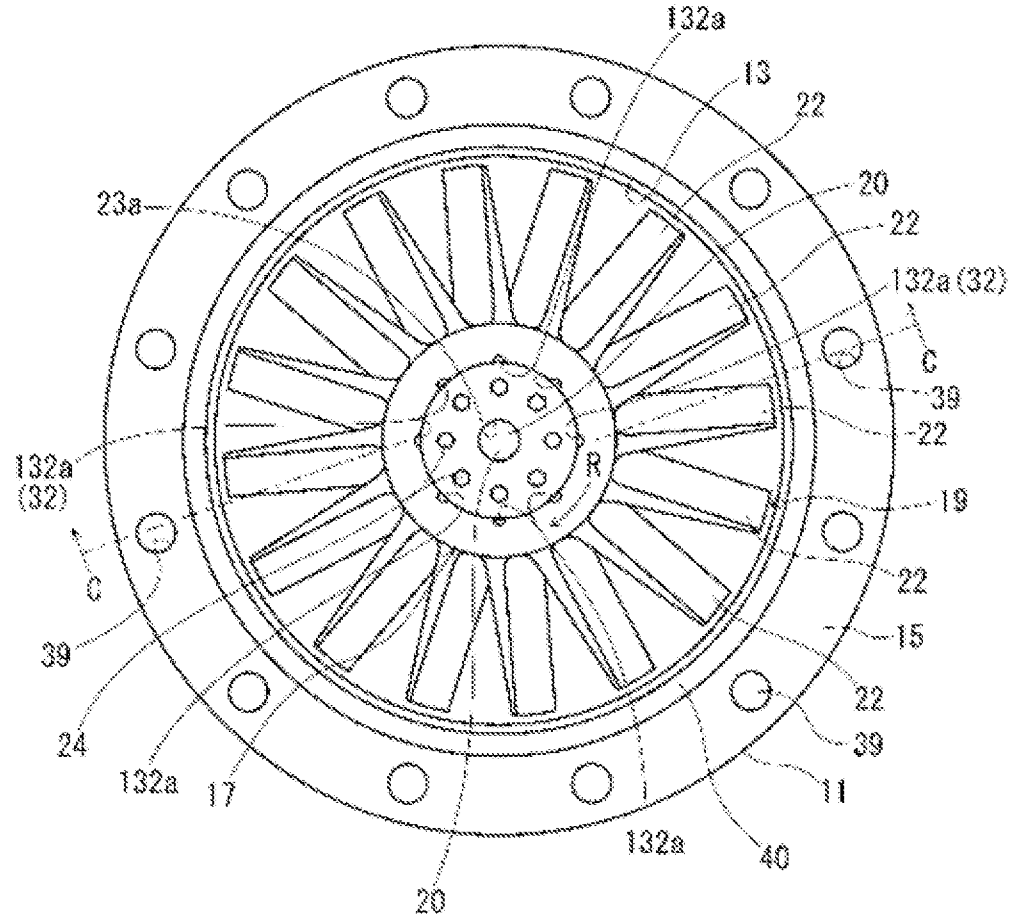
FIG. 8 is a plan view of a vacuum pump illustrated as another embodiment of the present invention.
Figure 9:
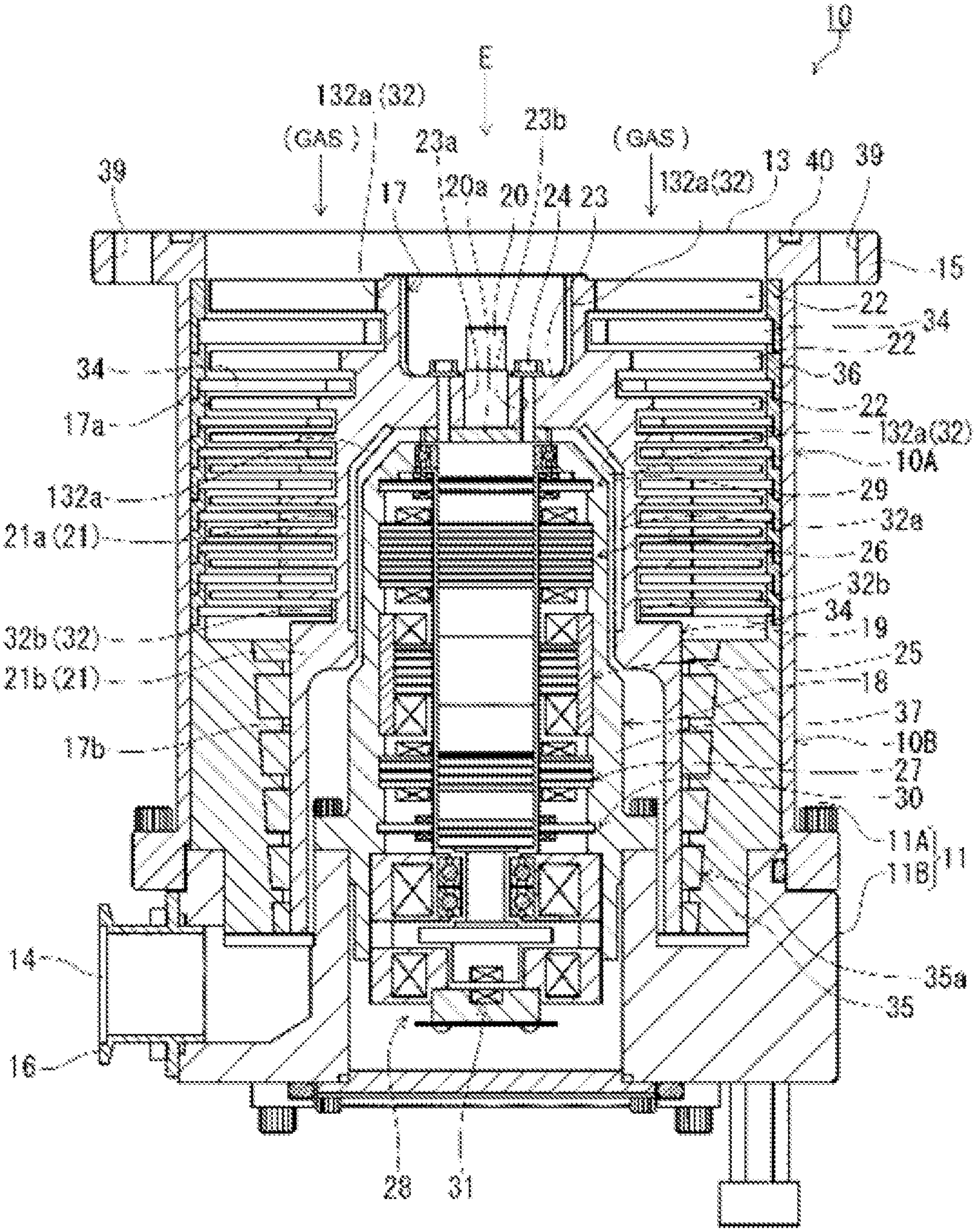
FIG. 9 is a longitudinal cross-sectional side view along line C-C of FIG. 8.
Figure 10:
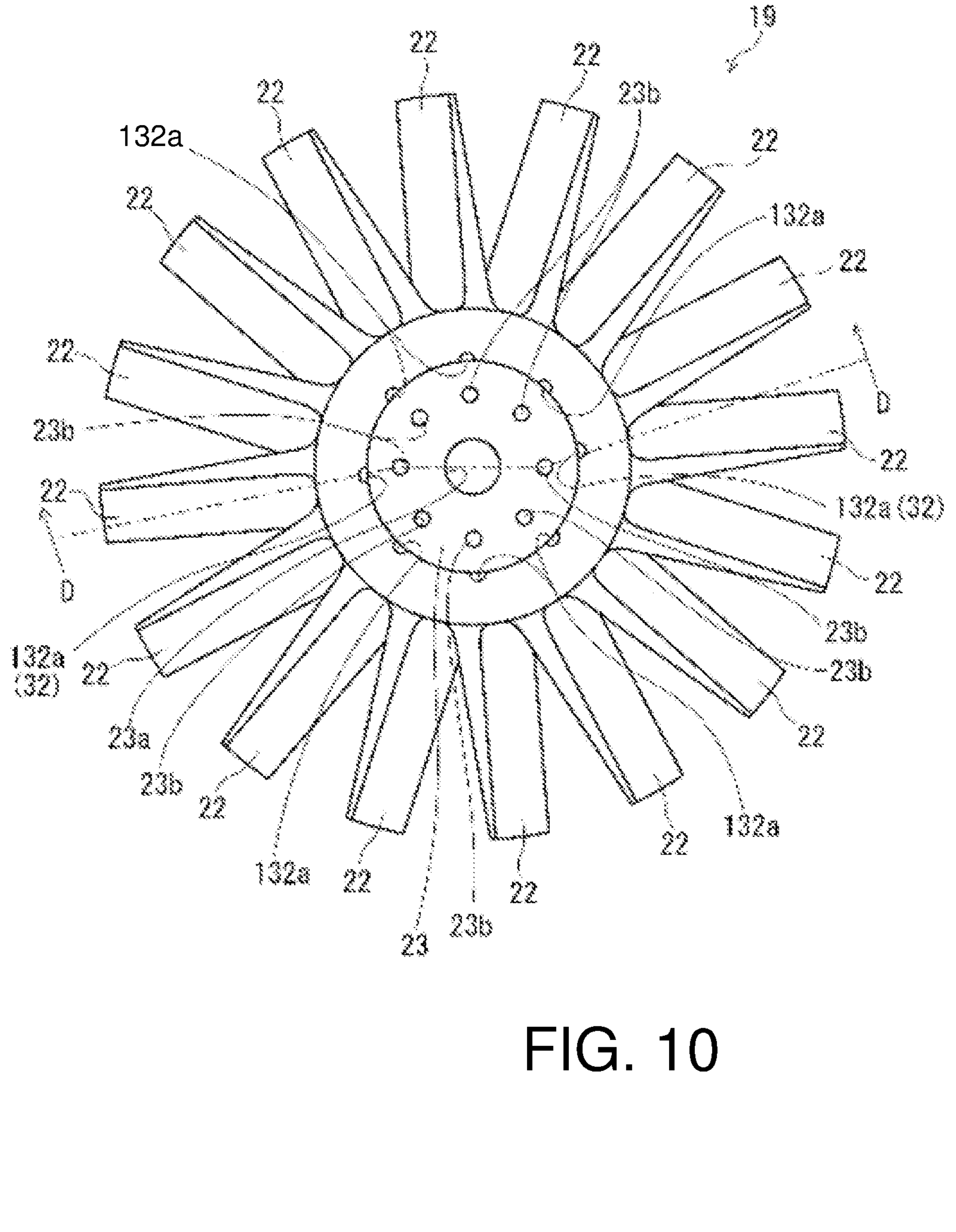
FIG. 10 is a plan view of a rotor body used in the vacuum pump illustrated in FIG. 8 and FIG. 9.
Figure 11:
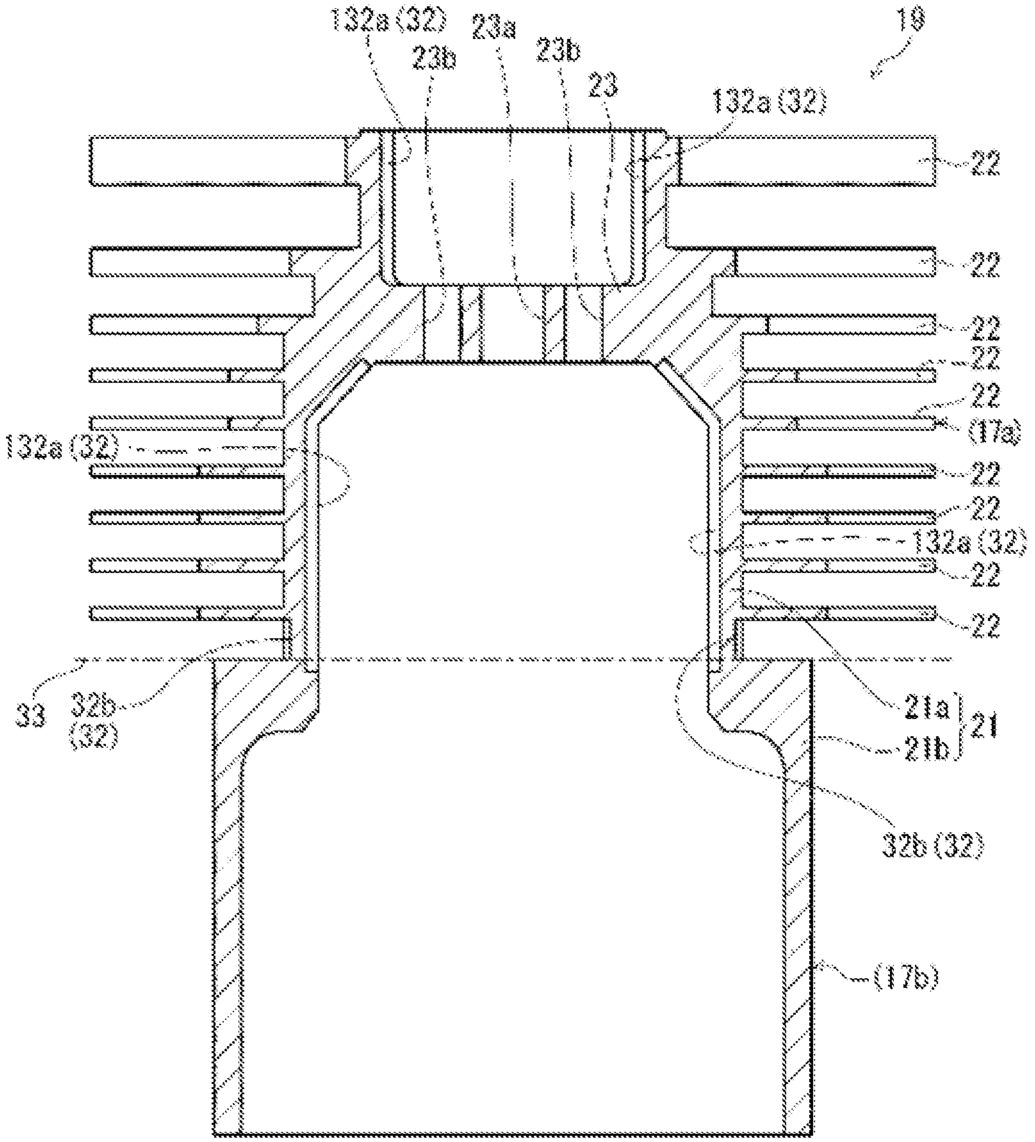
FIG. 11 is a longitudinal cross-sectional side view along line D-D of FIG. 10.

FIG. 8 to FIG. 11 illustrate a variation example of the vacuum pump 10 according to the present invention. FIG. 8 is a plan view, FIG. 9 is a longitudinal cross-sectional side view along line C-C of FIG. 8, FIG. 10 is a plan view of a rotor body 19 used in the vacuum pump illustrated in FIG. 8 and FIG. 9, and FIG. 11 is a longitudinal cross-sectional side view along line D-D of FIG. 10. Compared to the first rupture location control grooves 32*a* in the vacuum pump 10 of the embodiment illustrated in FIG. 1 to FIG. 7, which are substantially equally spaced apart circumferentially on the outer circumferential surface of the first cylindrical portion 21*a* and extend along the axial direction of the rotor body 19, the first rupture location control grooves in the variation example illustrated in FIG. 8 to FIG. 11 are substantially equally spaced apart circumferentially on an inner circumferential surface of the first cylindrical portion 21*a*, and extend along the axial direction of the rotor body 19. Other configurations are the same as those shown in FIG. 1 to FIG. 4, and same structural elements are given the same reference numerals to avoid repetitive description.

The part having a different structure from that of the embodiment illustrated in FIG. 1 to FIG. 4 is that, first rupture location control grooves 132*a* of the rupture location control grooves 32 are formed on the inner circumferential surface along the axial direction of the first cylindrical portion 21*a*, and a second rupture location control groove 32*b* of the rupture location control groove 32 is formed along an outer circumference at the lower end of the first cylindrical portion 21*a* adjacent the second cylindrical portion 21*b* similarly to the embodiment illustrated in FIG. 1 to FIG. 4.

The first rupture location control grooves 132*a* are substantially equally spaced apart circumferentially on the inner circumferential surface of the first cylindrical portion 21*a*, and extend along the axial direction of the rotor body 19 as illustrated in FIG. 8 to FIG. 11. The first rupture location control grooves 132*a* here are 5.8 mm in width and 8 to 15 mm in depth, for example, which may vary depending on the material and thickness of the cylindrical member 21. By providing the first rupture location control grooves 132*a*, the rotor body 19 is reduced in thickness and lowered in mechanical strength in locations where the first rupture location control grooves 132*a* are provided compared to other parts where the grooves are not provided. Moreover, the first rupture location control grooves 132*a* are provided such as to each correspond to each of the plurality of bolt holes 23*b* that are provided for secure attachment of the shaft 20 via bolts. Therefore, the portions where the first rupture location control grooves 132*a* are provided and the portions where the bolt holes 23*b* are provided are designed to be weaker and lower in mechanical strength than other parts. Accordingly, in the event of a higher torque than expected being generated in the rotor 17 and applied on the rotor 17, the rotor body 19 ruptures in a planned manner along the axial direction at locations where the first rupture location control grooves 132*a* are provided along the axial direction on the inner circumferential surface of the first cylindrical portion 21*a*, and this rupture can absorb the shock of torque.

In the variation example illustrated in FIG. 8 to FIG. 11, too, a plurality of first rupture location control grooves 132*a* are provided on the inner circumferential surface of the first cylindrical portion 21*a*, substantially equally spaced apart circumferentially and along the axial direction of the rotor body 19, as well as a second rupture location control groove 32*b* is provided along the outer circumference at the lower end of the first cylindrical portion 21*a* adjacent the second cylindrical portion 21*b* such as to horizontally surround the outer circumference of the first cylindrical portion 21*a* substantially all around. The rotor body 19 is reduced in thickness and lowered in mechanical strength in the locations where these first rupture location control grooves 132*a* and second rupture location control groove 32*b* are provided compared to other parts where the first rupture location control grooves 132*a* and second rupture location control groove 32*b* are not provided. Accordingly, in the event of a higher torque than expected being generated and applied on the rotor 17, rupture occurs at the locations of the first rupture location control grooves 132*a* and/or second rupture location control groove 32*b* in a planned manner along these grooves, whereby the first cylindrical portion 21*a* and second cylindrical portion 21*b* are separated into several pieces, and this separation absorbs the shock of torque. Here, for example, the first cylindrical portion 21*a* cracks along each of the plurality of first rupture location control grooves 132*a*, ruptures along the axial direction, and breaks apart into several pieces, and/or, the first cylindrical portion 21*a* and second cylindrical portion 21*b* rupture in the circumferential direction along the boundary 33 shown in FIG. 4 therebetween and break apart into several pieces. Namely, rupture occurs in a planned manner in planned locations which are the first rupture location control grooves 132*a* and/or second rupture location control groove 32*b*, so that the process after the rupture can be readily carried out in a preset procedure. This allows for consistent maintenance work and inexpensive processing.

While this variation example shows a structure for the vacuum pump 10 in which the second rupture location control groove 32*b* is formed horizontally substantially all around the outer circumference of the first cylindrical portion 21*a*, an alternative structure is also possible wherein the groove extends horizontally on the inner circumference of the first cylindrical portion 21*a* substantially all around.

The first rupture location control grooves 132*a* as rupture location control means are provided such as to each correspond to each of the plurality of bolt holes 23*b* that are provided for secure attachment of the shaft 20 via bolts.

Therefore, the portions where the first rupture location control grooves 132*a* are provided and the portions where the bolt holes 23*b* are provided are weaker and lower in mechanical strength than other parts. Accordingly, in the event of a higher torque than expected being generated in the rotor 17 and applied on the rotor 17, rupture occurs in a planned manner at the first rupture location control grooves 132*a* and at a location where a first rupture location control groove 132*a* is aligned with a bolt hole 23*b*, and absorbs the shock of torque. Thus the process after the rupture can be readily carried out in a preset procedure.

While this variation example has also shown a structure in which the first rupture location control groove 132*a* and second rupture location control groove 32*b* have a semicircular-curved cross-sectional shape, the shape is not limited to such a semicircular-curved section. For example, the grooves may have a square-shaped section, or a V-shaped section.

Further, it goes without saying that various modifications can be made to the present invention without departing from the spirit of the present invention, and that the present invention covers such modifications.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump comprising:

a casing formed with an inlet port or an outlet port; a stator portion disposed inside the casing; and a rotor enclosed in the casing and including a shaft rotatably supported on the stator portion, and a rotor body formed in a cylindrical shape with a plurality of blades arranged in multiple stages on an outer circumferential portion thereof, and secured to the shaft such as to be integrally rotatable therewith, the rotor body being provided with a plurality of angularly-spaced grooves, each groove having a length, a width that is shorter than the length, and a depth, with each groove provided:

on an outer circumferential surface of the rotor body such that the length extends along an axial direction of the rotor body between the blades adjoining each other in the axial direction, or on an inner circumferential surface of the rotor body such that the length extends along an axial direction of the rotor body.

2. The vacuum pump according to claim 1, the vacuum pump further comprises a groove provided on at least one of an outer circumferential surface or an inner circumferential surface of the rotor body along a circumferential direction of the rotor body.

3. The vacuum pump according to claim 1, wherein the groove is one of a plurality of grooves and wherein each groove corresponds to a respective bolt hole provided to the rotor body for attaching the rotor body to the shaft.

4. A rotor rotatably attached to a stator portion that is disposed inside a casing, which is formed with an inlet port or an outlet port, of a vacuum pump, the rotor comprising:

a shaft rotatably supported on the stator portion;

a rotor body formed in a cylindrical shape, with a plurality of blades arranged in multiple stages on an outer circumferential portion thereof, and secured to the shaft such as to be integrally rotatable therewith;

the rotor body having a plurality of angularly-spaced grooves, each groove having a length, a width that is shorter than the length, and a depth, and each groove provided:

on an outer circumferential surface of the rotor body such that the length extends along an axial direction of the rotor body between the blades adjoining each other in the axial direction, or on an inner circumferential surface of the rotor body such that the length extends along an axial direction of the rotor body.

5. A rotor body rotatably attached, via a shaft, to a stator portion that is disposed inside a casing, which is formed with an inlet port or an outlet port, of a vacuum pump, the rotor body comprising:

a cylindrical member formed in a cylindrical shape, with a plurality of blades arranged in multiple stages on an outer circumferential portion thereof; and a plurality of angularly-spaced grooves, each groove having a length, a width that is shorter than the length, and a depth, each groove provided:

on an outer circumferential surface of the rotor body such that the length extends along an axial direction of the rotor body between the blades adjoining each other in the axial direction, or on an inner circumferential surface of the rotor body such that the length extends along an axial direction of the rotor body.

* * * * *